Nov. 12, 1968  R. A. MAGRATH  3,410,626
INTERFERENCE FILTER

Filed April 28, 1964  2 Sheets-Sheet 1

INVENTOR
RICHARD A. MAGRATH
BY
ATTORNEYS

Nov. 12, 1968     R. A. MAGRATH     3,410,626

INTERFERENCE FILTER

Filed April 28, 1964     2 Sheets-Sheet 2

INVENTOR
RICHARD A. MAGRATH
BY Morse + Altman
ATTORNEYS

United States Patent Office
3,410,626
Patented Nov. 12, 1968

3,410,626
INTERFERENCE FILTER
Richard A. Magrath, Boston, Mass., assignor to Baird-Atomic, Inc., Cambridge, Mass., a corporation of Massachusetts
Filed Apr. 28, 1964, Ser. No. 363,114
1 Claim. (Cl. 350—166)

ABSTRACT OF THE DISCLOSURE

An optical filter is provided for transmitting two or more narrow passbands simultaneously. The filter is fabricated with a plurality of interference filter sections of different passband characteristics with the sections being arranged in side-by-side relation whereby one portion of the filter will transmit a particular wavelength while an adjacent portion will transmit a different wavelength. Compatible absorption filter material is superimposed over the interference filter sections to absorb undesirable wavelengths.

---

This invention relates generally to optical filters and more particularly is directed towards a new and improved interference filter capable of transmitting two or more narrow passbands simultaneously.

Optical interference filters are those in which the wavelengths which are not transmitted are removed by the phenomenon of interference rather than by absorption or by scattering. In addition to being able to duplicate most of the spectral characteristics of absorption color filters, interference filters are capable of transmitting a very narrow band of wavelengths. This characteristic of interference filters makes them particularly suitable for examining selected portions of the spectrum. However, for some applications such as spectroscopic calibration, for example, it is desirable to be able to pass two or more narrow passbands simultaneously through the same filter element. Heretofore, because of the optical characteristics of interference type filters, it has been necessary to change filters each time a different passband is to be transmitted.

Accordingly, it is an object of the present invention to provide improvements in optical filters.

Another object of this invention is to provide an optical filter capable of transmitting two or more narrow passbands simultaneously.

Still another object of this invention is to provide an interference filter of integrated construction adapted to pass two or more spectral bands.

More particularly, this invention features a multiple passband interference type optical filter characterized by a plurality of interference filtering sectors distributed across the element, each sector having a passband characteristic different from that of an adjacent sector. Typically the different filter sectors may be arranged in a stripe pattern whereby alternate stripes may be of one passband characteristic and the other striped sectors of another passband characteristic. This type of filter element would thereby be capable of passing two sharp passbands simultaneously. Alternatively, a checkerboard pattern made up of squares of four different interference elements may be employed to pass four passbands simultaneously.

Figure 1:
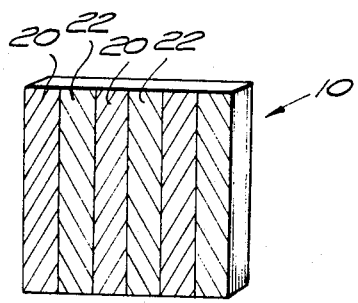
Figure 2:
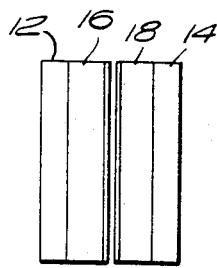
Figure 3:
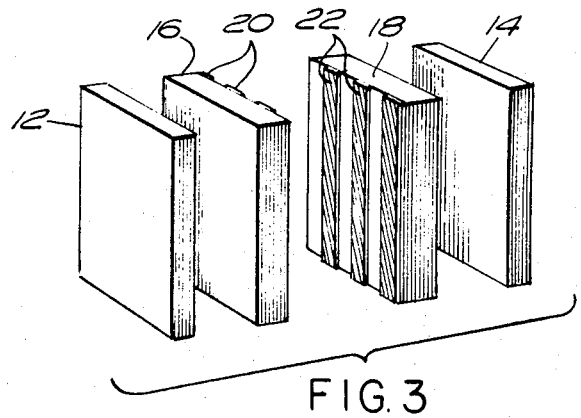
Figure 4:
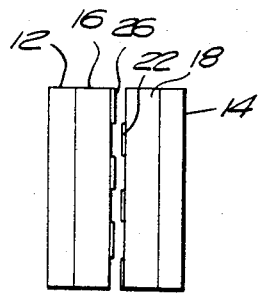
Figure 5:
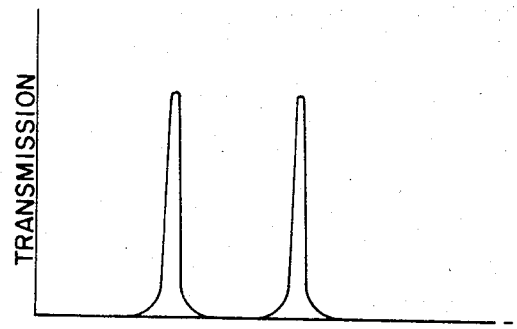
Figure 6:
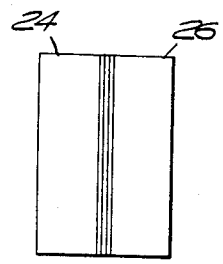
Figure 7:
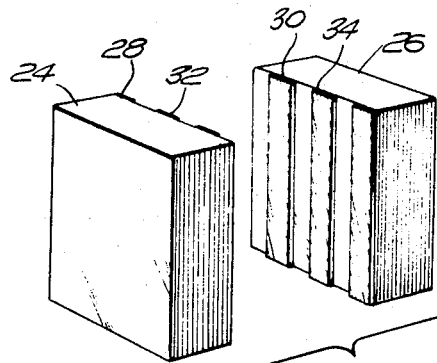
Figure 8:
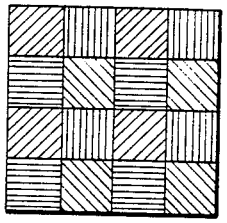
Figure 9:
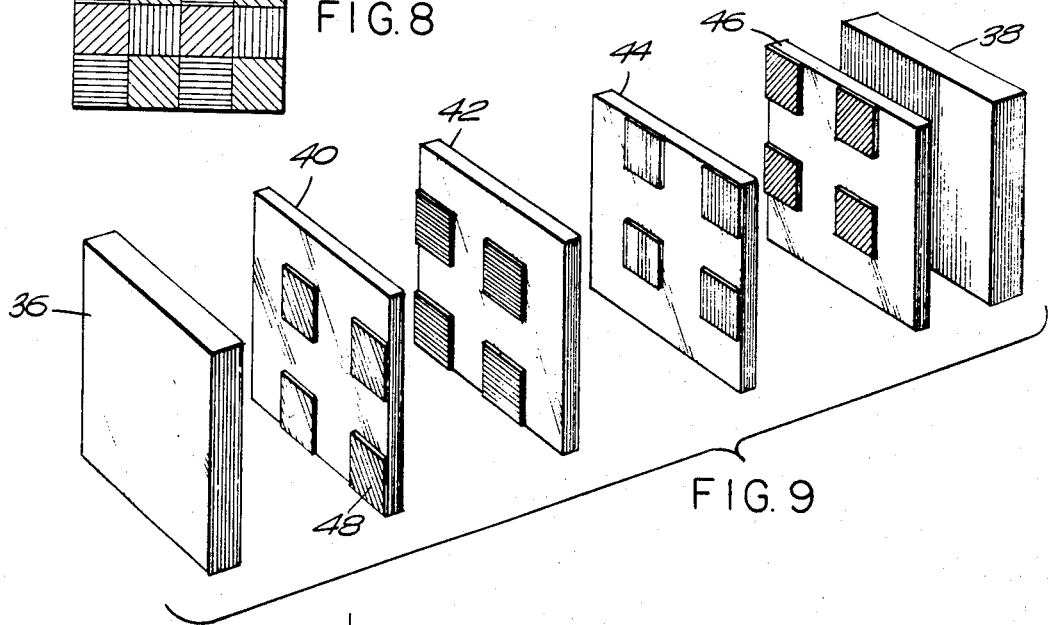
Figure 10:
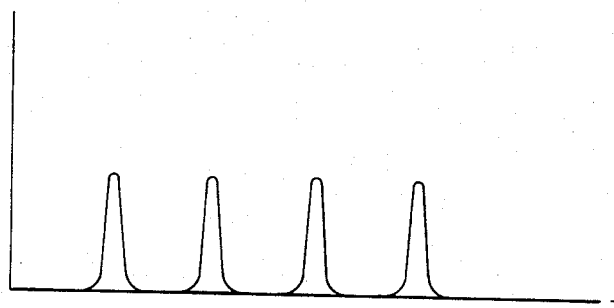

But these and other features of the invention, along with further objects and advantages thereof, will become more fully apparent from the following detailed description of preferred embodiments of the invention with reference being made to the accompanying drawings, in which:

FIG. 1 is a view in perspective of a double passband interference filter made according to the invention, FIG. 2 is a view in side elevation of the filter of FIG. 1, FIG. 3 is an exploded view in perspective showing the relationships of the several components of the FIG. 1 filter, FIG. 4 is a top plan view of the filter showing the two major components partially separated to illustrate their relationship, FIG. 5 is a graph showing the passband characteristics of the double passband filter of FIG. 1, FIG. 6 is a view in side elevation of a modification of the invention, FIG. 7 is a partially exploded view in perspective of the FIG. 6 filter, FIG. 8 is a view in front elevation showing another modification of the invention as adapted to pass four narrow passbands simultaneously, FIG. 9 is an exploded view in perspective of the FIG. 8 filter, and FIG. 10 is a graph showing the transmission characteristics of the FIGS. 8 and 9 filter.

In the drawings, dimensions have been exaggerated to some extent for the sake of clarity.

Referring now to FIGS. 1 through 4, the reference character 10 generally indicates a double passband interference type filter element comprising a pair of outer glass elements 12 and 14 which may be absorption blockers, if desired, to eliminate objectionable sidebands which might otherwise be transmitted through the filter. Disposed between the elements 12 and 14 is a pair of glass elements 16 and 18 preferably of clear optical glass and of the same dimensions of the outer elements 12 and 14.

Mounted on the oppositely facing surfaces of the glass elements 16 and 18 are evenly spaced parallel stripes 20 and 22 staggered with respect to one another, whereby the stripes will cover the entire width of the filter when assembled as in FIG. 1. In the practice of this invention, each of the stripes 20 on the element 16 comprises a stratum of interference type material having one passband characteristic, 5461 A. for example, while each of the stripes 22 on the element 18 comprises a stratum of interference type filter material having another passband characteristic 5770 A. for example. Thus when the several components are assembled into the unitary filter element of FIGS. 1 and 2, two narrow passbands may be simultaneously transmitted through the single composite filter.

The interference stripes 20 and 22 typically comprise a series of partially reflecting layers mounted in evenly spaced parallel relation by a series of dielectric layers. In practice, each partially reflecting layer may be a stratum of silver a few thousand angstroms in optical thickness. Most narrow band interference filters are of the Fabry-Perot type employing alternate strata of partially reflecting layers and dielectric layers each having an optical thickness of one-quarter wavelength. For higher peak transmission and lower off peak transmission, the semi-reflective metallic strata may be replaced by a series of dielectric layers of different refractive indices, the interface boundaries of which have a reflecting power of perhaps 4% in the case of glass and air, or less for two dielectrics whose refractive indices are close together. By making several layers of dielectric materials, alternately of high and low index, it is possible to reinforce the reflectivity of a single boundary and build it up by multiple reflections to any desired value. It is necessary only that the layers be of such thickness that the reflections from successive boundaries are in phase. When each layer is optically ¼ wavelengths in thickness, this reinforcement takes place. A complete filter typically would consist of a number of alternate layers of high and low dielectric of a thickness of ¼ wavelength apiece followed by a dielectric space which is an integral number of half waves and which is followed by several more quarter wavelength layers. For such a filter the reflectivity can be built up to perhaps 95% with a peak transmission of perhaps 90% and a bandwith as low as 5 angstroms. In practice the stripes 20 and 22 may be built up by vapor deposition, for example, from materials such as cryolite for the stratum of high index characteristic and zinc sulfide employed as the stratum of low index dielectric.

At all wavelengths at which the dielectric layer in either of the interference stripes 20 and 22 has an optical thickness of integral half waves, the filter will have a passband. The number of half waves corresponding to a given passband is called the order of passband. The transmission T of the filter can be represented by the equation $$T = \frac{t^2}{(1-r)^2 + 4r \sin^2(\delta/2)}$$

where $r$ is the reflectivity of the silver film, $t$ the transmission of the film in $$\delta = 4\pi d(n^2 - \sin^2 \theta)^{1/2} + 2y$$

where $d$ is the thickness of the dielectric layer, $n$ is its refractive index, $\lambda$ the wavelength, $y$ the phase shift experienced by the light at the metal-dielectric boundary and $\theta$ is the angle of incidence. By inspection of this equation, it is apparent that maxima occur when $\delta/2 = M\pi$, where M is an integer.

With the Fabry-Perot type interference filter employed in the stripes 20 and 22, it will be understood that each stripe will comprise several layers of high and low index dielectric and that the several layers of dielectric strata are of such thickness that the reflection of successive boundaries are in phase. With each layer being optically ¼ of a wavelength in thickness, reinforcement takes place. In a preferred embodiment, the dielectric layers may comprise multiple strata of sodium fluoride with alternate strata of zinc sulfide. By employing the alternate high and low dielectric strata an increase in the reflectivity is obtained so that a narrower bandwith is transmitted with substantially no absorption. The end result is lower off peak transmission and higher peak transmission. The boundary between two dielectric layers of refractive indices $N_1$ and $N_2$ has a reflecting power of perhaps 4% in the case of glass and air or less for two dielectrics whose indices are close together. The value of reflectivity R is given by the standard Fresnel reflection law:

$$r = \left(\frac{n_1 - n_2}{n_1 + n_2}\right)^2$$

It will be understood that in this type of filter the thickness of the high index strata determines the wavelength of the passband and the filter may be fabricated to transmit any desired wavelength by careful control of the dielectric strata.

The glass blocking elements 12 and 14 must be selected to have transmission characteristics compatible with both of the interference stripes 20 and 22 since the blocking elements span the entire surface of the filter when the several components are laminated together.

Where it is desired to fabricate a filter of this type for which glass blocking elements cannot be matched to the transmission characteristics of the two different interference stripes, a modified form of the invention may be employed as illustrated in FIGS. 6 and 7. In this embodiment, a pair of clear glass elements 24 and 26 serve to support stripes 28 and 30 of interference filter material having different passband characteristics and arranged so that the stripes on one element are in register with the openings between the stripes on the other element in the same fashion as the FIG. 1 embodiment. Absorption strata 32 and 34 are deposited over the interference strata in the form of stripes to be coextensive with the interference stripes. In this fashion, each stripe of interference filter carries its own compatible absorption blocker stratum which does not lie in the optical path of the other interference stripes which are of a different transmission characteristic.

In some instances, it may be desirable to employ an interference filter capable of transmitting more than two narrow passbands simultaneously. In this case, a filter assembly such as illustrated in FIGS. 8 and 9 may be employed to advantage. In this embodiment, the interference filter elements are arranged in checkerboard pattern employing four different interference filter components. Such a filter may be fabricated by laminating together a pair of glass elements 36 and 38, which may also be absorption blockers, if desired, together with four plies 40, 42, 44 and 46 each of glass and each having deposited on one surface thereof, several squares of optical interference strata 48. It will be understood that each ply 40, 42, 44 and 46 carries interference filter material of a different passband characteristic. The squares of interference material are arranged in such a pattern that when the several components are assembled into the integrated filter element shown in FIG. 8 a checkerboard pattern is obtained.

Various other patterns may be employed by which interference filter sections of differing transmission characteristics may be distributed over a supporting surface. For example, a triangular pattern or a series of concentric circles may be utilized. In any event, it is desirable that the areas of different passband characteristics be in relatively small increments. For example, in the striped pattern of FIG. 1 the stripes may be on the order of ⅟₁₆ to ⅟₃₂ of an inch in width and the checkerboard pattern of FIG. 8 may be composed of interference filter squares each on the order of ⅟₁₆ of an inch square. Thus, a collimated beam of light focused on a filter of this type will pass two or more spectral bands simultaneously.

While the invention has been described with particular reference to the illustrated embodiments, it will be understood that numerous modifications thereto will appear to those skilled in the art. Also, it will be understood that the above description and accompanying drawings should be taken as illustrative of the invention and not in a limiting sense.

Having thus described the invention, what I claim and desire to obtain by Letters Patent of the United States is:

1. A multi-passband optical interference filter, comprising
   (a) a plurality of interference filter sections of at least two different passband characteristics,
   (b) said sections being disposed in edge to edge relation with adjoining sections being of different passband characteristics,
   (c) a stratum of blocking material disposed separately over each of said interference sections, each stratum having transmission characteristics compatible with its associated interference section, and
   (d) transparent elements mounting said sections and said blocking strata in laminated relation in a unitary filter element adapted to transmit at least the two spectral bands transmittable through said filter sections.

References Cited

UNITED STATES PATENTS

| | | | |
|---|---|---|---|
| 2,392,502 | 1/1946 | Potter | 350—317 XR |
| 2,403,685 | 7/1946 | Sachtleben et al. | 350—166 |
| 2,416,918 | 3/1947 | Goldsmith | 350—313 XR |
| 2,809,133 | 10/1957 | Conover | 350—313 XR |
| 2,873,397 | 2/1959 | Gray | 350—166 XR |

DAVID SCHONBERG, *Primary Examiner.*

P. R. MILLER, *Assistant Examiner.*